(No Model.)
E. RADER & L. G. HEIST.
MEAT SCORER.
No. 494,027. Patented Mar. 21, 1893.
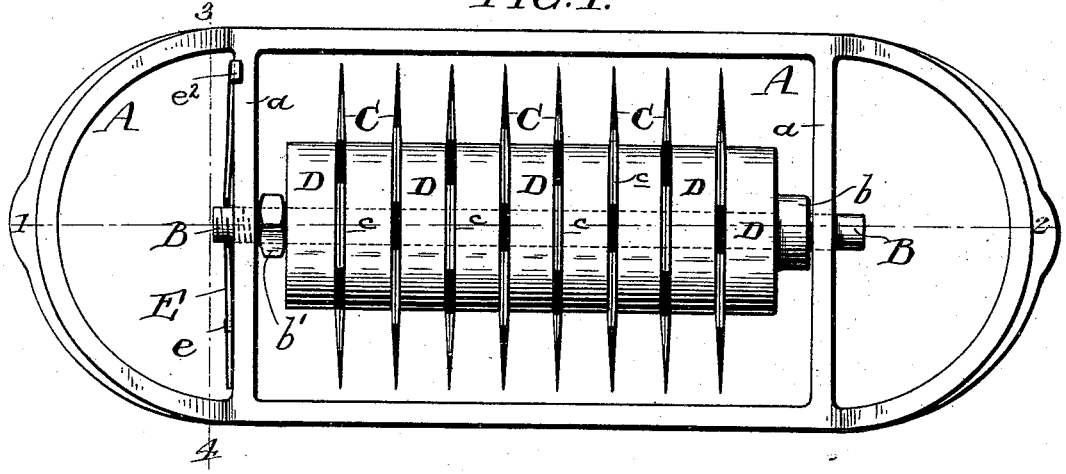
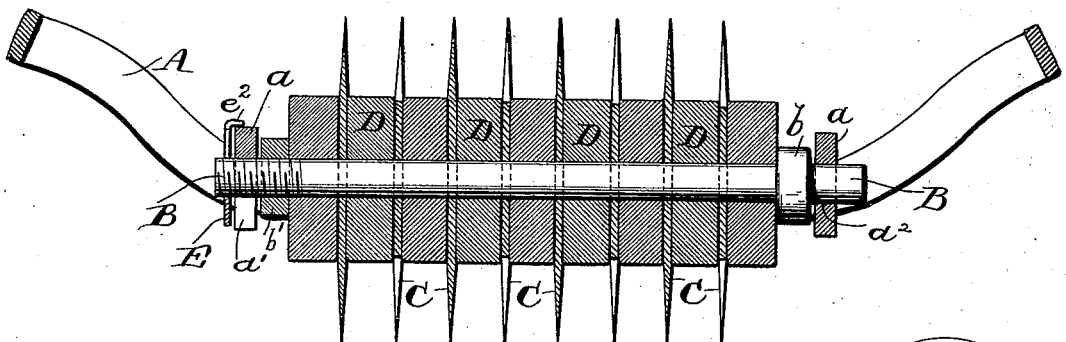
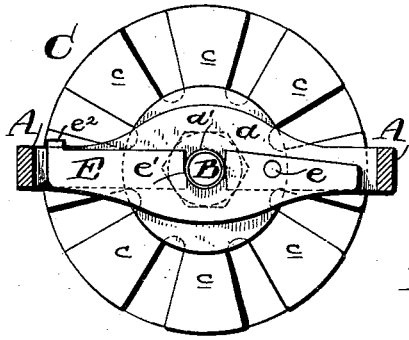
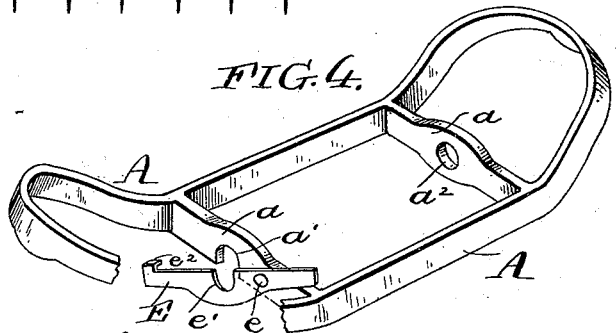
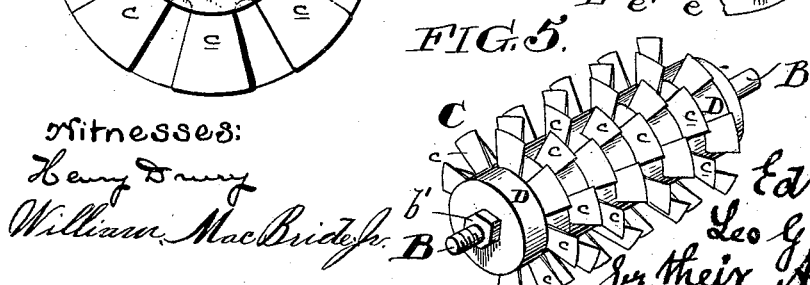
Witnesses:
Henry Drury
William MacBride Jr.
Inventors:
Edward Rader
Leo G. Heist
By their Attorney
Andrew O'Neill

UNITED STATES PATENT OFFICE.

EDWARD RADER AND LEO G. HEIST, OF PHILADELPHIA, PENNSYLVANIA.

MEAT-SCORER.

SPECIFICATION forming part of Letters Patent No. 494,027, dated March 21, 1893.

Application filed August 17, 1892. Serial No. 443,311. (No model.)

*To all whom it may concern:*

Be it known that we, EDWARD RADER and LEO G. HEIST, citizens of the United States of America, residing at Philadelphia, in the county of Philadelphia and State of Pennsylvania, have invented certain new and useful Improvements in Meat-Scorers, of which the following is a specification, reference being had therein to the accompanying drawings.

The object of our invention is to provide an inexpensive and effective meat tenderer the construction of which will enable the operator to put whatever pressure is needful upon the instrument to effect any desired tenderness of the meat.

In the accompanying drawings,—Figure 1 is a plan view of our improved instrument. Fig. 2 is a horizontal sectional view on the line 1—2 of Fig. 1. Fig. 3 is a cross-sectional view on the line 3—4. Fig. 4 is a perspective view of the frame which carries the rotating knives; and Fig. 5 is a perspective view of the knives and their carrying shaft.

A is a hollow oblong frame preferably made round at each end and having the cross-bars $a\ a$ one of which is provided with an inverted U-shaped recess $a'$ and the other with an opening $a^2$.

E is a spring latch pivoted at $e$ to the cross-bar $a$, adjacent to the recess $a'$, and having the U-shaped recess $e'$, and the projecting ledge $e^2$ which is adapted to rest upon the upper ledge of the cross-bar $a$, as shown in Figs. 1 and 2, to support the knife shaft B.

C are the knives or rotating disks made up of any desired number of cutting blades $C$, and mounted on the shaft B, with washers D spacing them apart. The shaft B when mounted in the frame A rests in the recess $a'$ and the opening $a^2$ in the cross-bars $a\ a$ and has at one end the rigid collar or boss $b$, against which is placed one of the washers D and then one of the knives C, and so on alternately until the opposite end of the shaft is reached which has a nut $b'$ working in a thread on the shaft, thus clamping the whole series of knives and washers together. The teeth $c$ of the cutting knives C, when arranged in series are set so as to present a staggered appearance as shown in Fig. 5 in order to be more effectual in their cutting capacity upon the meat. As will be readily seen the knives and their supporting shaft can be readily detached by means of the latch E for the purpose of washing or cleaning.

Having now described our invention, what we claim as new, and desire to secure by Letters Patent, is—

1. In a meat scorer the frame A having handles at each end thereof, cross-bars $a\ a$ having recesses $a'$ and $a^2$ therein, latch E having recesses $e'$ therein and lip $e^2$ in combination with shaft B carrying knives or cutting disks C and adapted to be carried by said cross-bars $a\ a$, substantially as set forth.

2. In a meat scorer the frame A having handles at each end cross-bars $a\ a$ having recesses $a'$ and $a^2$ therein, latch E having recess $e'$ therein, projecting ledge $e^2$ and pivot $e$ in combination with shaft B having thread and nut $b'$ and boss $b$, and carrying knives or cutting disks C and washers D substantially as set forth.

In testimony whereof we affix our signatures in presence of two witnesses.

EDWARD RADER.
LEO G. HEIST.

Witnesses:
CLIFFORD P. ALLEN, Jr.,
RICHARD C. GORMAN.